United States Patent [19]

Wegner et al.

[11] Patent Number: 5,326,499
[45] Date of Patent: Jul. 5, 1994

[54] ANTIFOAMS FOR THE PAPER INDUSTRY, BASED ON OIL-IN-WATER EMULSIONS

[75] Inventors: Brigitte Wegner, Speyer; Knut Oppenlaender, Ludwigshafen; Rudolf Schuhmacher, Boehl-Iggelheim; Andreas Hohmann; Gabriele Dralle-Vos, both of Ludwigshafen, all of Fed. Rep. of Germany

[73] Assignee: Basf Aktiengesellschaft, Ludwigshafen, Fed. Rep. of Germany

[21] Appl. No.: 933,191

[22] Filed: Aug. 20, 1992

[30] Foreign Application Priority Data

Aug. 22, 1991 [DE] Fed. Rep. of Germany ....... 4127719

[51] Int. Cl.$^5$ ..................... B01D 19/04; D21H 21/12
[52] U.S. Cl. .................... 252/321; 162/179; 252/358
[58] Field of Search ........... 252/312, 321, 358; 162/179

[56] References Cited

U.S. PATENT DOCUMENTS

| | | | |
|---|---|---|---|
| 2,346,928 | 4/1944 | Lighthipe | 252/321 |
| 4,009,119 | 2/1977 | Poschmann et al. | 252/358 |
| 4,454,113 | 6/1984 | Hemker | 252/312 X |
| 4,664,844 | 5/1987 | Bergold et al. | 252/358 |
| 4,895,681 | 1/1990 | Herrmann et al. | 252/321 X |
| 4,950,420 | 8/1990 | Svarz | 252/321 |
| 4,976,888 | 12/1990 | DeClercq et al. | 252/358 |

FOREIGN PATENT DOCUMENTS

| | | |
|---|---|---|
| 0149812 | 7/1985 | European Pat. Off. |
| 0322830 | 7/1989 | European Pat. Off. |
| 60-83559 | 5/1985 | Japan |
| 61-227756 | 10/1986 | Japan |

OTHER PUBLICATIONS

Database WPIL, An-81-12382D, & JP-A-55159810, Dec. 13, 1980, "Antifoam for Production of - - - Paper - - - Pulp-Comprises - - - Glycerine - - - Ester, Fatty Acid and Poly:Alcohol Ester Emulsion".

Primary Examiner—Richard D. Lovering
Attorney, Agent, or Firm—Oblon, Spivak, McClelland, Maier & Neustadt

[57] ABSTRACT

Antifoams for the paper industry are based on oil-in-water emulsions in which the oil phase accounts for from 5 to 50% by weight of the emulsion and contains
(a) an alcohol of not less than 12 carbon atoms, fatty esters of alcohols of not less than 22 carbon atoms and $C_1$–$C_{36}$-carboxylic acids, distillation residues which are obtainable in the preparation of alcohols having a relatively large number of carbon atoms by the oxo synthesis or by the Ziegler method and which may be alkoxylated, a mixture of the stated compounds and/or
(b) a fatty ester of a $C_{12}$–$C_{22}$-carboxylic acid with a monohydric to trihydric $C_1$–$C_{18}$-alcohol and, if required,
(c) a hydrocarbon having a boiling point above 200° C. or a fatty acid of 12 to 22 carbon atoms, in combination with (d) from 1 to 80% by weight of polyglyceryl esters which can be prepared by not less than 20% esterification of a polyglycerol mixture which contains, as essential components, di-, tri- and tetraglycerol and, if required, polyglycerols having higher degrees of condensation with saturated or unsaturated $C_{12}$–$C_{36}$-fatty acids.

2 Claims, No Drawings

ANTIFOAMS FOR THE PAPER INDUSTRY, BASED ON OIL-IN-WATER EMULSIONS

The present invention relates to antifoams for paper industry, based on oil-in-water emulsions, in which the oil phase accounts for from 5 to 50% by weight of the emulsion, and contains a combination of known antifoams, for example long-chain alcohols or fatty esters of $C_{12}$–$C_{22}$-carboxylic acids and monohydric to trihydric alcohols, with polyglyceryl esters as essential components.

U.S. Pat. No. 4,950,420 discloses antifoams for the paper industry which contain from 10 to 90% by weight of a surfactant polyether, such as polyoxyalkylated glycerol or polyalkoxylated sorbitol, and from 10 to 90% by weight of a fatty ester of a polyhydric alcohol, such as a mono-or diester of polyethylene glycol or polypropylene glycol. These antifoams are free of any oils, amides or water-repellent silica or silicone oils.

EP-A-0 140 812 discloses that antifoams based on oil-in-water emulsions, in which the oil phase of the emulsion contains (a) a $C_{12}$–$C_{26}$-alcohol, distillation residues which have been obtained in the preparation of alcohols having a relatively high number of carbon atoms by the oxo synthesis or by the Ziegler method and may furthermore be alkoxylated and/or (b) a fatty ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms, accounts for from 15 to 60% by weight of the emulsion and has a mean particle size of from 0.5 to 15 μm, can be stabilized to an increase in viscosity and creaming during storage by adding from 0.05 to 0.5% by weight of a high molecular weight, water-soluble homo- or copolymer of acrylic acid, methacrylic acid, acrylamide or methacrylamide.

JP-A-60/083559 and JP-A-61/227756 disclose the use of polyglyceryl fatty esters as antifoams in the production of foods, for example tofu. These formulations contain no fatty alcohols; the presence of alkaline earth metal salts is, however, essential. Antifoam formulations are known to be effective only for the range of applications for which they have been developed, for example in the textile industry, food industry, paper industry, surface coating industry and leather industry. Owing to this specific effectiveness, antifoams cannot be successfully transferred to, or used in, other areas.

Antifoams based on oil-in-water emulsions, which are usually used in papermaking, are known to be less effective when the temperature of the aqueous system to be defoamed increases to above 35° C. At temperatures above 50° C., an even more rapid decrease in the effectiveness of the antifoams occurs when the known oil-in-water emulsions are used. Since there is an increasing tendency to use closed water circulations in the paper mills, the result is an increase in the temperature of circulated water in papermaking, so that the effectiveness of the antifoams used to date is markedly reduced.

EP-A-0 322 830 discloses antifoams based on oil-in-water emulsions, in which the oil phase of the emulsions contains (a) a $C_{12}$–$C_{26}$-alcohol, distillation residues which are obtainable in the preparation of alcohols having a relatively large number of carbon atoms by the oxo synthesis or by the Ziegler method and which may furthermore be alkoxylated and/or (b) a fatty ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms, accounts for from 5 to 50% by weight of the emulsion and has a mean particle size of <25 μm, and in which from 5 to 50% by weight of components (a) and (b) of the oil phase of the oil-in-water emulsions have been replaced by (d) one or more compounds which melt at above 70° C. and are selected from the group consisting of the fatty alcohols of not less than 28 carbon atoms, the esters of a $C_1$–$C_{22}$-carboxylic acid with an alcohol of not less than 28 carbon atoms, the adducts of $C_2$–$C_4$-alkylene oxides with alcohols of not less than 28 carbon atoms, the polyethylene waxes having a molecular weight of not less than 2,000, the carnauba waxes, the montanic ester waxes and the montanic acid waxes and salts thereof.

The oil-in-water emulsions are effective anti-foams in papermaking even at above 35° C., for example at from 50° to 60° C.

It is an object of the present invention to provide antifoams for the paper industry which, at 50° C. or higher, are at least as effective as the products used to date for this purpose or are even more effective than these.

We have found that this object is achieved, according to the invention, by antifoams for the paper industry, based on oil-in-water emulsions, in which the oil phase accounts for from 5 to 50% by weight of the emulsion if the oil phase of the emulsions contains (a) an alcohol of not less than 12 carbon atoms, fatty esters of alcohols of not less than 22 carbon atoms and $C_1$–$C_{36}$-carboxylic acids, distillation residues which are obtainable in the preparation of alcohols having a relatively large number of carbon atoms by the oxo synthesis or by the Ziegler method and which may furthermore be alkoxylated, a mixture of the stated compounds and/or (b) a fatty ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms, in combination with (d) from 1 to 80% by weight of polyglyceryl esters which are obtainable by not less than 20% esterification of a polyglycerol mixture of
from 0 to 10% by weight of monoglycerol,
from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and
from 0 to 5% by weight of polyglycerols having higher degrees of condensation
with one or more fatty acids of 12 to 36 carbon atoms.

These antifoams are used, in amounts of from 0.02 to 0.5 part by weight per 100 parts by weight of the foam-forming medium, for preventing foam in pulp cooking, the beating of paper stock, papermaking and the dispersing of pigments for papermaking. In the stated amounts, they also act as deaerators in paper stocks.

In particular, alcohols of not less than 12 carbon atoms or mixtures of alcohols are used as component (a) of the oil-in-water emulsions. As a rule, these are monohydric alcohols which contain up to 48 carbon atoms in the molecule. Such products are commercially available. However, fatty alcohols which contain a substantially larger number of carbon atoms in the molecule may also be used as component (a). Components (a) are either natural or synthetic alcohols. For example, lauryl alcohol, myristyl alcohol, cetyl alcohol, palmityl alcohol, stearyl alcohol, behenyl alcohol, oleyl alcohol, ricinoleyl alcohol, linoleyl alcohol and erucyl alcohol are suitable.

Mixtures of alcohols, for example mixtures of (1) alcohols of 12 to 26 carbon atoms and (2) alcohols of 28 to 48 carbon atoms, can also be used as component (a).

The synthetic alcohols, which are obtainable, for example, by the Ziegler method by oxidation of alkylaluminums, are saturated, straight-chain unbranched alcohols. Synthetic alcohols are also obtained by the oxo synthesis. As a rule, alcohol mixtures are obtained here. Distillation residues which are obtained in the preparation of the abovementioned alcohols by the oxo synthesis or by the Ziegler method can also be used as component (a) of the oil phase of the antifoam emulsions. Alkoxylated distillation residues which are obtained in the abovementioned processes for the preparation of higher alcohols by the oxo synthesis or by the Ziegler method are also suitable as component (a) of the oil phase of the antifoam emulsions. The oxyalkylated distillation residues are obtained by subjecting the distillation residues to alkoxylation with ethylene oxide or with propylene oxide or with a mixture of ethylene oxide and propylene oxide by a known method. Up to 5 ethylene oxide or propylene oxide groups undergo addition per OH group of the alcohol in the distillation residue. Preferably, 1 or 2 ethylene oxide groups undergo addition per OH group of the alcohol in the distillation residue.

Other suitable components (a) are fatty esters of alcohols of not less than 22 carbon atoms and $C_1$-$C_{36}$-carboxylic acids, for example montan waxes or carnauba waxes.

The abovementioned compounds of component (a), either alone or as a mixture with one another in any ratios as part of component (a), may form the oil phase of the oil-in-water emulsions.

The fatty esters of $C_{12}$-$C_{22}$-carboxylic acids with a monohydric to trihydric $C_1$-$C_{18}$-alcohol are used as component (b) of the oil phase of the antifoam emulsion. The fatty acids which form the basis of the esters are, for example, lauric acid, myristic acid, palmitic acid, stearic acid, arachic acid and behenic acid. Palmitic acid or stearic acid is preferably used for the preparation of the esters. Monohydric $C_1$-$C_{18}$-alcohols can be used for esterifying the stated carboxylic acids, for example methanol, ethanol, propanol, butanol, hexanol, decanol and stearyl alcohol, as well as dihydric alcohols, such as ethylene glycol, or trihydric alcohols, such as glycerol. The polyhydric alcohols may be completely or partially esterified.

The oil phase of the emulsion may additionally be formed by a further class of water-insoluble compounds which are referred to below as component (c). The compounds of component (c) may account for up to 50% by weight, based on components (a) and (b), of the oil phase of the antifoam emulsions. They may be added either to a mixture of components (a) and (b) or to each of the compounds stated under (a) or (b). Suitable components (c) are hydrocarbons having a boiling point of more than 200° C. at 1013 mbar and a pour point below 0° C., or fatty acids of 12 to 22 carbon atoms. Preferred hydrocarbons are liquid paraffins, such as the commercial paraffin mixtures, which are also referred to as white oil.

Components (a) and (b) can be used in any ratio for the preparation of the antifoam emulsions. Each of these two components may be present in the antifoams either alone or as a mixture with the other. In practice, for example, mixtures of (a) and (b) which contain from 40 to 60% by weight of component (a) and from 60 to 40% by weight of component (b) have proven useful. The oil phase of the oil-in-water emulsions may additionally contain one or more compounds (c). However, it is essential that at least one of the abovementioned components (a) and (b) in combination with one or more compounds of the following group (d) forms the oil phase of the oil-in-water emulsions. The compounds (d) account for from 1 to 80, preferably from 5 to 20, % by weight of the oil phase of the oil-in-water emulsions. This means that the oil phase of the antifoam emulsions necessarily contains one of the following combinations: (a) and (d), (b) and (d) and (a), (b) and (d). The compounds of component (c) may be used in amounts of up to 40% by weight, based on the oil phase of the oil-in-water emulsions, in the case of all three abovementioned combinations of the composition of the oil phase.

Suitable components (d) of the oil phase are polyglyceryl esters which are obtainable by not less than 20% esterification of polyglycerol mixtures of from 0 to 10% by weight of glycerol,
from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and
from 0 to 5% by weight of polyglycerols having a high degree of condensation with one or more fatty acids having 12 to 36 carbon atoms in the molecule. The polyglycerol mixtures described above are preferably esterified with fatty acids of 16 to 30 carbon atoms. The degree of esterification is from 20 to 100%, preferably from 60 to 100%. The fatty acids which are suitable for esterifying the polyglycerol mixtures may be saturated fatty acids as well as unsaturated fatty acids, for example lauric acid, myristic acid, palmitic acid, stearic acid, arachic acid, behenic acid and montanic acid. Ethylenically unsaturated fatty acids, for example oleic acid, hexadecenoic acids, elaidic acid, eicosenoic acids and docosenoic acids, such as erucic acid or brassidic acid, and polyunsaturated acids, such as octadecenedienoic acids and octatrienoic acids, such as linoleic acid and linolenic acid and mixtures of the stated saturated and unsaturated carboxylic acids are also suitable for esterifying the polyglycerol mixtures.

The polyglycerol mixtures are obtainable, for example, by alkaline-catalyzed condensation of glycerol at elevated temperatures (cf. for example Fette, Seifen, Anstrichmittel, 88th year, No. 3, pages 101 to 106 (1986) or DE-A 3 842 692), by reacting glycerol with epichlorohydrin in the presence of an acidic catalyst at elevated temperatures. However, the mixtures are also obtainable by mixing the pure polyglycerol components, for example diglycerol, triglycerol and tetraglycerol, with one another. The polyglycerol mixtures which are not less than 20% esterified are prepared by esterifying the polyglycerol mixtures with the desired fatty acid or mixture of fatty acids by a known method. As a rule, the reaction is carried out in the presence of an acidic esterification catalyst, such as sulfuric acid, p-toluenesulfonic acid, citric acid, phosphorous acid, phosphoric acid or hypophosphorous acid, or of a basic catalyst, such as sodium methylate or potassium tertbutylate.

The compounds of component (d) are present in an amount of from 1 to 80, preferably from 5 to 20, % by weight in the oil phase. The oil phase accounts for from 5 to 50% by weight of the oil-in-water emulsions, while the content of the aqueous phase in the emulsions is from 95 to 50% by weight, the percentages by weight summing to 100.

The oil phase is emulsified in the aqueous phase. Apparatuses in which the components of the emulsion are subjected to a strong shear gradient, for example dispersers, are required for this purpose. In order to obtain particularly stable oil-in-water emulsions, the emulsification of the oil phase in the aqueous phase is preferably carried out in the presence of surfactants which have an HLB value of more than 6 (for the definition of the HLB value, see W. C. Griffin, Journal of the Society of Cosmetic Chemists, 5 (1954), 249–246). The surfactants are oil-in-water emulsifiers or typical wetting agents. Among the surfactants, it is possible to use anionic, cationic or nonionic compounds or mixtures of these compounds which are compatible with one another, for example mixtures of anionic and nonionic or of cationic and nonionic wetting agents. Substances of the stated type are, for example, sodium salts or ammonium salts of higher fatty acids, such as ammonium oleate or ammonium stearate, oxyalkylated phenols, such as nonylphenol or isooctylphenol which have been reacted with ethylene oxide in a molar ratio of from 1:2 to 1:50, oxyethylated unsaturated oils, for example the reaction products of one mol of castor oil and from 30 to 40 mol of ethylene oxide or the reaction products of one mol of sperm alcohol with from 60 to 80 mol of ethylene oxide. Sulfated oxyethylation products of nonylphenol or octylphenol are also preferably used as emulsifiers, said products being present as the sodium or ammonium salt of the corresponding sulfuric half-ester. 100 parts by weight of the oil-in-water emulsions usually contain from 0.1 to 5 parts by weight of an emulsifier or of an emulsifier mixture. In addition to the abovementioned emulsifiers, protective colloids, such as high molecular weight polysaccharides and soaps, or other conventional additives, such as stabilizers, may also be used in the preparation of the oil-in-water emulsions. For example, the addition of from 0.05 to 0.5% by weight, based on the total emulsion, of high molecular weight, water-soluble homo- and copolymers of acrylic acid, methacrylic acid, acrylamide or methacrylamide as a stabilizer has proven useful. For example, EP-A 0 149 812 relates to the use of such stabilizers.

Emulsifying the oil phase in the aqueous phase gives oil-in-water emulsions which have a viscosity of from 300 to 3,000 mPa.s immediately after preparation and a mean particle size of the oil phase of less than 25 $\mu$m, preferably from 0.5 to 15 $\mu$m.

Although the compounds of component (d), alone or as a mixture with component (c), have virtually no activity as oil-in-water emulsion antifoams, combining a compound of component (d) with compounds (a) and/or (b) surprisingly results in a synergistic effect, which is most pronounced for the combination of (a) with (d) and (a) with (b) and (d). The addition of component (d) to the oil phase of antifoams which contain components (a) and/or (b) and, if required, further components in emulsified form has little or no adverse effect on the effectiveness of the resulting antifoams at relatively low temperatures, for example at room temperature, but increases the effectiveness of the antifoams to an unexpected extent in aqueous systems whose temperature is above 40° C. The novel oil-in-water emulsions are used in the paper industry in aqueous systems in which the formation of foam at relatively high temperatures must be prevented, for example in pulp cooking, in the beating of paper stock, in papermaking with closed water circulations in paper machines, and in the dispersing of pigments for papermaking. From 0.02 to 0.5, preferably from 0.05 to 0.3, part by weight of the oil-in-water antifoam emulsion is used per 100 parts by weight of paper stock in a foam-forming medium. When added to a paper stock suspension, the antifoams furthermore result in deaeration and are therefore also used as deaerators in papermaking (added to the paper stock). They are also suitable as antifoams in paper coating, where they are added to paper coating slips. The antifoams can also be used in the food industry, in the starch industry and in wastewater treatment plants for preventing foam. If they are added to the paper stock as a deaerator, the amounts used for this purpose are from 0.02 to 0.5 part by weight per 100 parts by weight of paper stock.

In the Examples which follow, parts and percentages are by weight. The mean particle size of the particles of the oil phase which are emulsified in water was determined using a Coulter counter. The K value of the polymers was determined according to H. Fikentscher, Cellulose-Chemie, 13 (1932), 58–64 and 71–74, in aqueous solution at 25° C., at a concentration of 0.5% by weight and at a pH of 7.

Determination of the foam index 5 l of a foam-forming paper stock suspension (0.1% of groundwood) are circulated for 5 minutes in a channel of a transparent plastic. The amount of foam formed on the surface of the stock suspension is then measured in area units (cm$^2$) with the aid of a grid on the wall of the channel and is expressed as a foam index for evaluating the effectiveness of an antifoam.

If the paper stock suspension is circulated for 5 minutes in the absence of an antifoam, a foam index of from 1,200 to 1,250 cm$^2$ is obtained. By adding in each case 2 mg/l of an effective antifoam (a total of 10 mg, based on solids) to the paper stock suspension, this index is substantially reduced, so that it constitutes a measure of the effectiveness of an antifoam.

Testing the Antifoams

Depending on the test, the temperature of the paper stock suspension is 30°, 40°, 50° or 60° C., the temperature being kept constant within ±1° C. during the 5 minute test.

Since the foam zero value is different at 30°, 40°, 50° and 60° C., the effectiveness of an antifoam is represented as the percentage of residual foam.

The percentage of residual foam (R) is calculated as $$R = \frac{S_e \cdot 100}{S_0}$$

where $S_o$ is the foam index measured after the additon of an antifoam and $S_o$ is the foam zero value, ie. the value measured in the absence of an antifoam. In this terminology, the smaller R is the better the antifoam.

EXAMPLE 1

An oil-in-water emulsion in which the oil phase accounts for 30% by weight of the emulsion and has a mean particle size of from 3 to 10 μm is prepared with the aid of a disperser.

The oil phase consists of the following components:
(a) 21 parts of a fatty alcohol mixture of $C_{12}$-$C_{26}$-alcohols,
(b) 5 parts of triesters of glycerol with $C_{16}$-$C_{18}$-fatty acids,
(c) 1 part of a mineral oil (commercial white oil) and
(d) 2 parts of a polyglyceryl ester which is obtainable by esterifying a polyglycerol mixture of
  27% of diglycerol,
  44% of triglycerol,
  19% of tetraglycerol and
  10% of polyglycerols having higher degrees of condensation
with a $C_{12}$-$C_{26}$-fatty acid mixture. The degree of esterification is 60%.

The water phase consists of:
65 parts of water,
3 parts of an emulsifier which is obtainable by subjecting 25 mol of ethylene oxide to an addition reaction with
1 mol of isooctylphenol and esterifying the adduct with sulfuric acid to give the half-ester,
1 part of a copolymer of 70% of acrylamide and 30% of acrylic acid, having a K value of 270, and
0.2 part of sodium hydroxide solution.

Components (a) to (d) are first heated to 110° C. and then added to the aqueous phase at 80° C. with dispersing. The oil-in-water emulsion thus obtained has a viscosity of 2650 mPa.s at 20° C. immediately after preparation. The effectiveness of this antifoam emulsion is tested, as described above, on a paper stock suspension. The following results are obtained for the residual foam index R in percent at each of the temperatures used for the paper stock suspension:

| T (°C.) | R (%) |
|---------|-------|
| 30      | 22    |
| 50      | 11    |
| 60      | 26    |

COMPARATIVE EXAMPLE 1

An oil-in-water emulsion is prepared by the method stated in Example 1, except that component (d) is omitted and the amount of the fatty alcohol mixture of component (a) is increased to 23 parts. An emulsion whose viscosity immediately after preparation, at 20° C., is 540 mPa.s is obtained. When this emulsion is tested, the following residual foam indices in percent are obtained for the temperatures of the paper stock suspension which are stated in the Table:

| T (°C.) | R (%) |
|---------|-------|
| 30      | 17    |
| 50      | 42    |

-continued

| T (°C.) | R (%) |
|---------|-------|
| 60      | 68    |

If these values are compared with the residual foam index according to Example 1, it is evident that the foam index of the comparative emulsion at 30° C. is slightly better than that of the emulsion according to Example 1. However, if the temperature of the paper stock suspension is increased to 50° or 60° C. in the test, the inferiority of the emulsion according to Comparative Example 1 is clearly evident. At 60° C., the emulsion according to Example 1 is more than twice as effective as the emulsion according to Comparative Example 1.

EXAMPLE 2

Several oil-in-water emulsions, all of which have the following identical qualitative composition, are prepared with the quantitative composition of the oil phase shown in Table 1:
(a) Fatty alcohol mixture of $C_{12}$-$C_{26}$-alcohols,
(b) triesters of glycerol with $C_{16}$-$C_{18}$-fatty acids,
(d) polyglyceryl esters prepared by 55% esterification of a polyglycerol mixture of
  27% of diglycerol,
  44% of triglycerol,
  19% of tetraglycerol and
  10% of polyglycerols having higher degrees of condensation
with $C_{12}$-$C_{26}$-fatty acids.

In contrast to the emulsion according to Example 1, the aqueous phase is brought to pH 6.5. This change leads to a substantial decrease in the viscosity of the emulsions.

| Exam- | Composition of the oil phase [parts] | | | | Residual foam R % at | |
|-------|------|------|-----|-----------|--------|--------|
| ple   | (a)  | (b)  | (d) | Viscosity | 30° C. | 50° C. |
| 2.1   | 23.0 | 6.2  | 1   | 370       | 27     | 15     |
| 2.2   | 22.0 | 6.2  | 2   | 390       | 23     | 9      |
| 2.3   | 21.0 | 6.2  | 3   | 460       | 28     | 12     |
| 2.4   | 4.0  | 24.2 | 2   | 290       | 36     | 17     |

EXAMPLE 3

An emulsion is prepared by the method described in Example 2, the aqueous phase of Example 1 remaining unchanged and the oil phase of the antifoam having the following composition:
(a) 22.0 parts of a fatty alcohol mixture of $C_{12}$-$C_{26}$-alcohols,
(b) 6.2 parts of a triester of glycerol with a $C_{16}$-$C_{18}$-fatty acid and
(d) 2 parts of polygyceryl esters prepared by esterifying a polyglycerol mixture of
  27% of diglycerol,
  44% of triglycerol,
  19% of tetraglycerol and
  10% of polyglycerols having higher degrees of condensation
with a montanic acid in a ratio of 1:3. The degree of esterification is 60%.

The viscosity of this emulsion immediately after preparation is 2930 mPa.s. Testing of the emulsion as an antifoam is carried out by the method described above and gives the following values

| T (°C.) | R (%) |
|---------|-------|
| 30 | 20 |
| 50 | 11 |
| 60 | 25 |

EXAMPLE 4

An emulsion is prepared by the method described in Example 2, the aqueous phase of Example 1 remaining unchanged and the oil phase of the antifoam having the following composition:
(a) 22.0 parts of a fatty alcohol mixture of $C_{12}$–$C_{26}$-alcohols,
(b) 6.2 parts of a triester of glycerol with a $C_{16}$–$C_{18}$-fatty acid and
(d) 2 parts of polyglyceryl esters which are obtainable by esterifying a polyglycerol mixture of
27% of diglycerol,
44% of triglycerol,
19% of tetraglycerol and
10% of polyglycerols having higher degrees of condensation
with a $C_{22}$-fatty acid in a weight ratio of 1:2, the degree of esterification being 40%.

The viscosity of this emulsion immediately after preparation is 660 mPa.s. The emulsion is tested as an antifoam by the method described above. The following results are obtained:

| T (°C.) | R (%) |
|---------|-------|
| 30 | 15 |
| 50 | 14 |
| 60 | 31 |

We claim:
1. A process, for preventing foam in pulp cooking, in the beating of paper stock, in paper making and in dispersing pigments for paper making, which comprises adding an effective amount of an antifoam, said antifoam being based on an oil-in-water emulsion in which the oil phase accounts for from 5 to 50% by weight of the emulsion and contains
   (a) a member selected from the group consisting of an alcohol of not less than 12 carbon atoms, fatty esters of alcohols of not less than 22 carbon atoms and $C_1$–$C_{36}$-carboxylic acids, distillation residues which are obtainable in the preparation of alcohols having a relatively large number of carbon toms by the oxo synthesis or by the Ziegler method and which may be alkoxylated, and a mixture therein,
   (b) a fatty ester of a $C_{12}$–$C_{22}$-carboxylic acid with a monohydric to trihydric $C_1$–$C_{18}$-alcohol and, optionally,
   (c) a hydrocarbon having a boiling point above 200° C. or a fatty acid of 12 to 22 carbon atoms, in combination with
   (d) from 1 to 80% by weight of polyglyceryl esters which are obtainable by not less than 20% esterification of a polyglycerol mixture of
      from 0 to 10% by weight of monoglycerol,
      from 15 to 40% by weight of diglycerol,
      from 30 to 55% by weight of triglycerol,
      from 10 to 25% by weigth of tetraglycerol,
      from 0 to 15% by weight of pentaglycerol,
      from 0 to 10% by weight of hexaglycerol and
      from 0 to 5% by weight of polyglycerols having higher degrees of condensation
   with one or more fatty acids of 12 to 36 carbon atoms.

2. A process for preventing foam in paper stocks which comprises adding from 0.02 to 0.5 parts by weight per 100 parts by weight of paper stock of an antifoam based on an oil-in-water emulsion, in which the oil phase contains from 5 to 50% by weight of the emulsion and said oil phase contains
   (a) a member selected from the group consisting of an alcohol of not less than 12 carbon atoms, fatty esters of alcohols of not less than 22 carbon atoms and $C_1$–$C_{36}$-carboxylic acids, distillation residues which are obtainable in the preparation of alcohols having a relatively large number of carbon atoms by the oxo synthesis or by the Ziegler method which may be alkoxylated, and a mixture therein,
   (b) a fatty ester of a $C_{12}$–$C_{22}$-carboxylic acid with a monohydric to trihydric $C_1$–$C_{18}$-alcohol and, if required,
   (c) a hydrocarbon having a boiling point above 200° C. or a fatty acid of 12 to 22 carbon atoms, in combination with
   (d) from 1 to 80% by weight of polyglycerly esters which are obtainable by not less than 20% esterification of a polyglycerol mixture of
      from 0 to 10% by weight of monoglycerol,
      from 15 to 40% by weight of diglycerol,
      from 30 to 55% by weight of triglycerol,
      from 10 to 25% by weight of tetraglycerol,
      from 0 to 15% by weight of pentaglycerol,
      from 0 to 10% by weight of hexaglycerol and
      from 0 to 5% by weight of polyglycerols having higher degrees of condensation with one or more fatty acids of 12 to 36 carbons atoms.

* * * * *

UNITED STATES PATENT AND TRADEMARK OFFICE
CERTIFICATE OF CORRECTION

PATENT NO. : 5,326,499
DATED : July 5, 1994
INVENTOR(S) : Brigitte WEGNER, et al.

It is certified that error appears in the above-indentified patent and that said Letters Patent is hereby corrected as shown below:

On the title page, Item [75], the 5th inventor's last name should read as follows:

--Dralle-Voss--

Signed and Sealed this

Twentieth Day of September, 1994

Attest:

BRUCE LEHMAN

*Attesting Officer*     *Commissioner of Patents and Trademarks*